Oct. 20, 1953 — M. P. VORE ET AL — 2,656,509
APPARATUS FOR MEASURING THE VECTOR DIFFERENCE
OF TWO ALTERNATING CURRENT VOLTAGES
Filed March 4, 1950 — 3 Sheets-Sheet 1
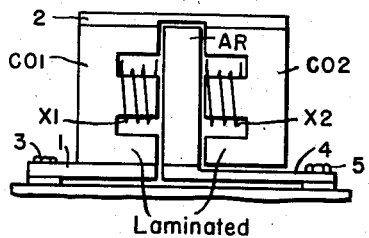
Fig.1.
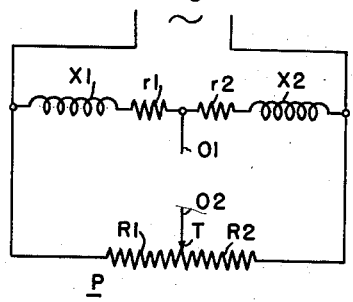
Fig.2.
Fig.3.
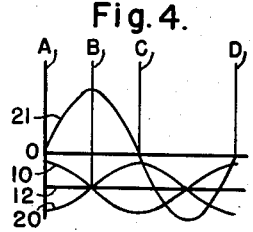
Fig.4.
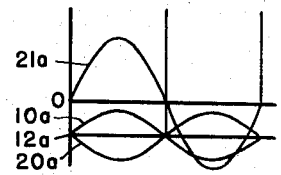
Fig.5.
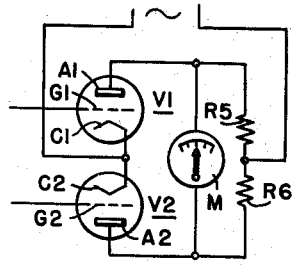
Fig.6.
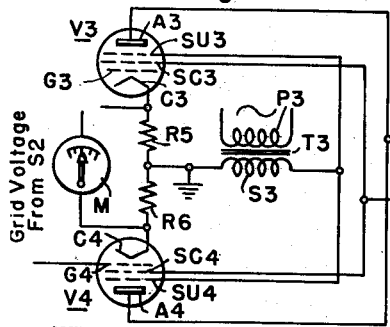
Fig.7.
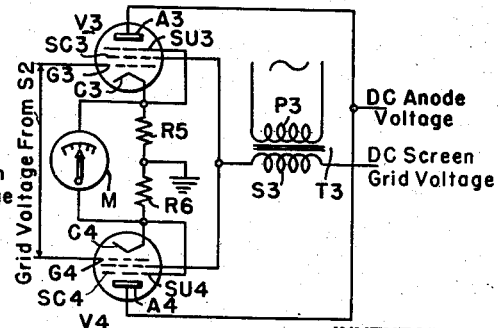
Fig.8.
WITNESSES:
E. A. McCloskey
E. L. Oberheim
INVENTORS
Milton P. Vore and
Maurice J. Gelpi.
BY Paul E. Friedemann
ATTORNEY

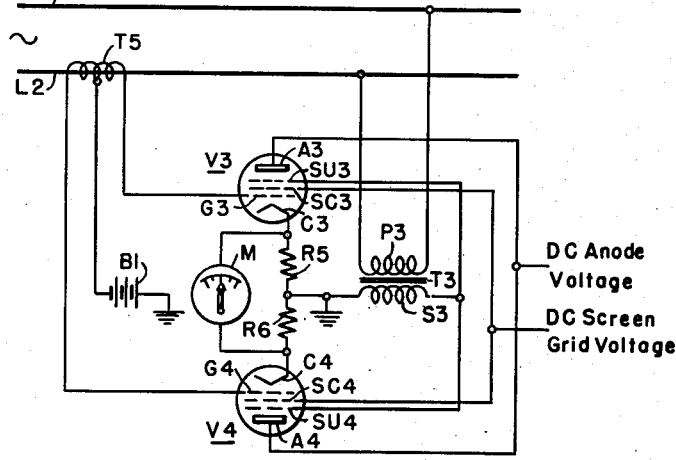

Oct. 20, 1953  M. P. VORE ET AL  2,656,509
APPARATUS FOR MEASURING THE VECTOR DIFFERENCE
OF TWO ALTERNATING CURRENT VOLTAGES
Filed March 4, 1950  3 Sheets-Sheet 3

WITNESSES:

INVENTORS
Milton P. Vore and
Maurice J. Gelpi.
BY
ATTORNEY

Patented Oct. 20, 1953

2,656,509

UNITED STATES PATENT OFFICE 2,656,509

APPARATUS FOR MEASURING THE VECTOR DIFFERENCE OF TWO ALTERNATING CURRENT VOLTAGES

Milton P. Vore, Catonsville, and Maurice J. Gelpi, Baltimore, Md., assignors to Westinghouse Electric Corporation, East Pittsburgh, Pa., a corporation of Pennsylvania Application March 4, 1950, Serial No. 147,636

4 Claims. (Cl. 324—98)

This invention relates generally to electrical measuring apparatus and more in particular to such apparatus which is applicable in alternating current systems.

As will be appreciated from a study of this disclosure, this invention is of general application, and it is equally applicable in systems for measuring various physical or various electrical conditions. By way of illustration in one embodiment, this invention is employed in measuring the output of a strain gauge. In this application, an electrical bridge circuit is utilized including the two coils of the strain gauge in adjacent legs thereof. It is preferred in this connection to employ a null balance type of bridge. However, with such a bridge, it is usually difficult to obtain a null balance indication due to the fact that the gauge coils are not purely inductive but additionally have finite resistance properties. If these resistance properties are not equal to ohmic value, a true null indication is not obtainable due to the quadrature currents which are circulating in the bridge. Thus, the bridge unbalance voltage may be reduced to a minimum value as the null balance condition is approached, and then beyond this position the unbalance voltage again increases. In order to obtain a true null balance indication, the elimination of the quadrature component of current in the circuit of the indicating instrument is necessary.

One object of this invention is to provide an electrical measuring system which is simple in its elements and accurate in operation.

Another object of this invention is to provide an electrical measuring circuit for A. C. systems in which means are provided for indicating the direction of unbalance of the bridge circuit.

Yet another object of this invention is to provide an electrical impedance bridge circuit for use with alternating current systems in which the quadrature component of bridge unbalance current due to certain resistive properties of components of the bridge do not appear in the indication of bridge unbalance.

A further object of this invention is to provide an electrical impedance bridge circuit of the null balance type for use on alternating current systems in which a null indication is obtainable even though the ratio of the reactive to the resistive properties of the one leg does not equal the ratio of the reactive to the resistive properties of an adjacent leg.

The foregoing statements are merely illustrative of the various aims and objects of this invention. Other objects and advantages will become apparent upon a study of the following disclosure when considered in conjunction with the accompanying drawings, in which:

Fig. 1 is a schematic drawing of an electric gauge employable with this invention;

Fig. 2 diagrammatically illustrates a conventional electrical bridge circuit of the type commonly used in connection with an electric gauge as illustrated in Fig. 1;

Fig. 3 diagrammatically illustrates an electrical measuring system embodying the principles of this invention;

Figs. 4 and 5 are curves depicting the operation of the system of Fig. 3;

Fig. 6 is a detail variation of the instrument circuit included in Fig. 3;

Figs. 7 and 8 are further modifications of the instrument circuit illustrated in Fig. 3;

Figure 13:
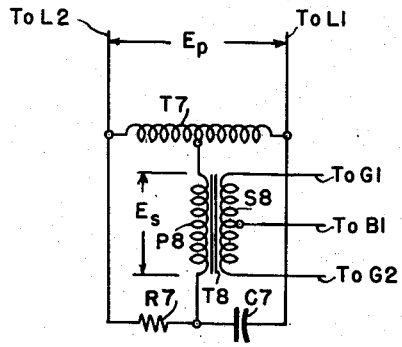
Figure 14:
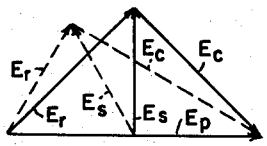
Figure 15:
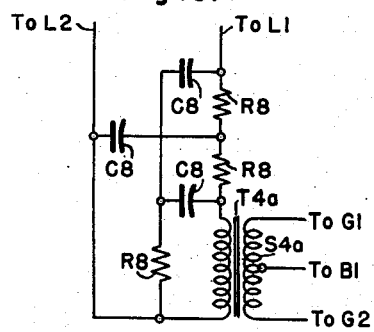
Figure 16:
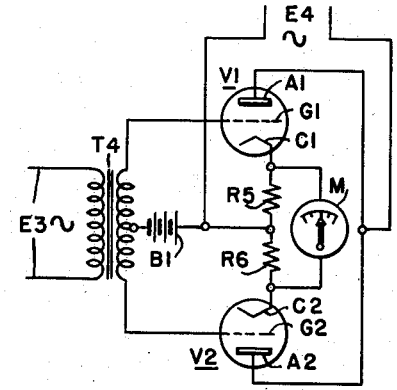
Figure 17:
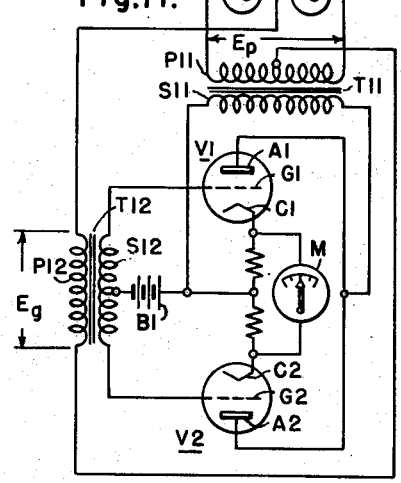
Figure 18:
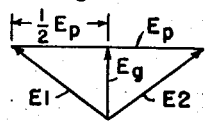
Figure 19:
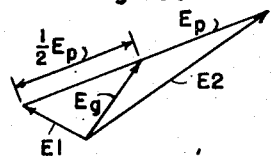

Fig. 9 diagrammatically illustrates the application of this circuit in power measurement;

Fig. 10 diagrammatically illustrates the application of this invention in the measurement of frequency deviation;

Figs. 11 and 12 are vector diagrams relating to Fig. 10;

Fig. 13 is a diagrammatic showing of a modification of a portion of the circuit of Fig. 10;

Fig. 14 is a vector diagram relating to Fig. 13;

Fig. 15 is a further modification of a portion of the circuit of Fig. 10;

Fig. 16 is a circuit embodying the principles of this invention for measuring the component of a voltage which is in phase with the voltage from a reference source;

Fig. 17 is a circuit embodying the principles of this invention for determining with great accuracy when two A. C. voltages of the same frequency but not necessarily in phase or 180° out of phase are equal in magnitude; and Figs. 18 and 19 are vector diagrams relating to Fig. 17.

The electric gauge illustrated in Fig. 1 is an electromagnetic device involving a pair of laminated E-shaped core members CO1 and CO2, the extremities of which are disposed in spaced confronting relation. An armature AR is disposed between the extremities of the core members CO1 and CO2 to form air gaps of a predetermined size therewith and to complete the magnetic circuit for each core section. Normally, the armature member is so position between the core members that the air gaps on the opposite sides of the armature are equal in which case, other things being equal, the reluctances of the magnetic circuits will be equal. A coil X1 is disposed about the central core leg of the core CO1, and a coil X2 is disposed about the central core leg of the core CO2. The two cores are positioned in the spaced relation mentioned by means of a strap 2 of non-magnetic material which bridges the upper ends of the core, as viewed in Fig. 1. This assembly of the cores is fastened to a member to be subjected to a stress by means of a strap 1 which is secured by a bolt 3 at one end thereof to the member to be stressed. The free end of the strap 1 is secured to the lower extremity of the core CO1. The armature A is maintained in its position between the confronting extremities of the cores by means of a strap 4 which at one end is secured to the member to be stressed by a bolt 5 at a point spaced a predetermined distance from the point of fastening of the strap 1 to this member. Thus, it will be appreciated that a predetermined gauge length of the member to be stressed is included between the points of support of the armature AR and the core assembly, and that upon stressing of the member, for example in compression, the armature A will be moved toward the extremities of the core CO1 to decrease the air gaps therebetween and at the same time will be moved away from the extremities of the core CO2 to increase the air gaps on that side. This unbalances the reluctances of the separate magnetic circuits, increasing the magnetic flux in the core CO1 and decreasing the magnetic flux in the core CO2 and thereby changing the reactances of the coils X1 and X2 in opposite directions. As illustrated in Fig. 2, these coils are conveniently connected as adjacent legs in an electrical bridge circuit the remaining two adjacent legs of which are formed by the tapped sections R1 and R2 of a variable impedance device such as an adjustable auto transformer or a potentiometer. A potentiometer designated P is illustrated. Thus, it will be appreciated that upon energization of this bridge with alternating current, as indicated by the sinusoidal wave in Fig. 2 that an unbalance of the reactances of the coils X1 and X2 produces an unbalanced voltage across the terminals G1 and G2. Since the response of a strain gauge, such as described in connection with Fig. 1 is inherently linear, it will be appreciated that the unbalanced voltage across the output terminals O1 and O2 will be indicative of the strain of the member.

If null balance measurements are to be made to obviate the inherent inaccuracies of a deflection type system, the tap T of the potentiometer P is moved along the potentiometer to reduce the voltage appearing across the terminals O1 and O2 to zero. This is the point at which the bridge is rebalanced, and the extent of movement of the tap of the potentiometer is an indication of the degree of unbalance of the bridge. However, it is a practical impossibility to manufacture coils, such as X1 and X2, which are free of finite values of resistance. Although these resistance values may be extremely small, a system of this type can be made highly sensitive and, as a consequence, any small variation between the values of resistance of the two gauge coils produces a quadrature component of current across the output terminals of the bridge circuit, which prevents reducing the unbalance voltage across the output terminals to zero. The finite values of resistance of the coils X1 and X2 have been symbollically represented in Fig. 2 as resistors $r1$ and $r2$, respectively, in series with the associated coil. For a bridge of this type to be perfectly balanced, it is necessary that two conditions exist. These are set forth in Equations 1 and 2 below in which the reference characters employed to identify the various components are assumed to represent the values of the electrical properties of these components.

$$\frac{X_1}{R_1} = \frac{X_2}{R_2} \qquad (1)$$

and $$\frac{X_1}{r_1} = \frac{X_2}{r_2} \qquad (2)$$

From these equations, it will be appreciated that unless Equation 2 is satisfied, varying the ratio of R1 to R2 by adjustment of the tap will merely cause the output voltage of the bridge to pass through a minimum value, but the minimum will not be zero. Additionally, in a bridge circuit of the type shown in Fig. 2, using instruments of the D'Arsonval type with a rectifier or thermocouple or instruments of the moving iron type as balance detectors, the instrument deflects up-scale, regardless of the direction of unbalance of the bridge.

The present invention therefore comprises a circuit which is of the electronic type and a zero center D'Arsonval instrument which is so arranged as to provide a bridge balance indicator in which the direction of deflection of the instrument indicates the direction in which the bridge is unbalanced and which also gives a null indication, even though the requirements of Equation 2 above are not satisfied. If the ratios of X1 to $r1$ and X2 to $r2$ are large enough, Equation 1 can be used to compute the approximate ratio of the reactance of coil X1 to the reactance of coil X2 from the known values of resistance of the sections R1 and R2 of the potentiometer P when the indicator null position is obtained. The error decreases as the ratios X1 to $r1$ and X2 to $r2$ increase, and for reasonable values of these quantities, the error is small.

In Fig. 3, the bridge circuit again includes the coils X1 and X2 with their series finite resistance values represented in the series resistors $r1$ and $r2$, respectively, together with the potentiometer P, the tapped portions R3 and R4 of which constitute the remaining adjacent legs. The bridge circuit is energized by means of alternating current which may be applied directly across the input terminals of the bridge, if of suitable value. However, if the alternating current supply is not of suitable value, a transformer T1 is employed having its primary winding P1 connected across the alternating current supply and its secondary winding S1 connected across the input terminals of the bridge circuit. With this arrangement, the voltage may be scaled to the magnitude required for energizing the bridge. The instrument circuit for measuring the bridge unbalance embodies a pair of vacuum tubes V1 and V2, each having an anode, a cathode and a control grid. These are respectively designated for tube V1; A1, C1 and G1, and for tube V2; A2, G2 and C2. The tubes are connected in parallel across the alternating current supply conductors. The cathode circuits of tubes V1 and V2, respectively, include the resistors R5 and R6. The grids G1 and G2 are controlled by the unbalance voltage of the bridge circuit. If this voltage is of suitable magnitude, it may be applied to the respective grids through suitable impedance means arranged to provide a ground return for the grid circuits in the usual way, but if not of suitable value, a transformer T2 is employed having its primary winding P2 connected across the output terminals of the bridge circuit, one terminal of which is constituted by the tap of the potentiometer P and the other terminal of which lies between the coils X1 and X2 of the gauge. The secondary winding S2 of this transformer is connected on one side to the grid G1 and on the other side to the grid G2. Either transformer T1 or T2 is necessary for D. C. circuit isolation.

Thus, it will be appreciated that the grid potentials are 180° out of phase. A unidirectional bias for the grids is applied by means of a battery B1 connected to the center tap of the secondary winding S2 and to the circuit point between the resistors R5 and R6. In using transformers, such as T1 and T2 in this circuit, it is necessary that they be designed to introduce no phase shift between the primary winding voltages of these transformers and the secondary winding voltages thereof. Any degree of phase shift between the secondary winding voltages of these two transformers will result in improper function of the system and errors in the determination of bridge unbalance.

The output voltage of the bridge across the primary winding P2 includes two components. One component is in phase with the voltage applied to the bridge from the secondary S1 of the transformer T1, and the other component is in quadrature with the bridge supply voltage. This component is due to the resistive properties of the two gauge coils. Unless Equation 2 hereinabove is satisfied, the quadrature component will differ from zero, even though Equation 1 is satisfied and this prevents attaining a true null balance position of the tap T in the usual case.

However, the present circuit ignores the quadrature component which may be seen by reference to Fig. 4. In this figure, the curve 21 denotes the plate voltage for both tubes V1 and V2. The curve 10 denotes the grid voltage of the grid G1 while the curve 20 denotes the grid voltage of the grid G2. Curve 12, which is a horizontal line positioned below the abscissa at O, denotes the negative bias which is applied to both of the grids by the battery B1. During a half cycle, the bridge input and anode voltage applied to V1 and V2 vary sinusoidally from zero to a maximum value and then to zero. The quadrature component of bridge output voltage applied at the same time to the grid of V1 will vary sinusoidally from a maximum value through zero to a negative maximum value, and the voltage applied to the grid of V2, 180° out of phase with that applied to the grid of V1, will vary from a negative maximum value through zero to a positive maximum value. The conduction of current through tubes V1 and V2 is a function of the anode and grid potentials applied to these tubes.

Thus, during the first quarter cycle of alternating current designated from A to B in the curve of Fig. 4, the grid G1 is positive with respect to the bias voltage and grid G2 is negative with respect to the bias voltage. Therefore, tube V1 conducts more current than tube V2 until point B is reached. At this instant both grids are at the same bias potential and both tubes conduct equally. From point B to point C the grid voltages are interchanged with respect to what they were between points A and B. Therefore during this latter quarter cycle tube V2 conducts more current than tube V1. Because tubes V1 and V2 have similar characteristics, the excess currents during each of these quarter cycles are equal. During the next half cycle the anode voltage on each tube is negative and neither tube conducts. Therefore, the potential across the resistors R5 and R6 in the cathode circuits of these tubes T1 and T2 will be an alternating current voltage of twice the bridge supply frequency with no direct current component. Thus, because of the inertia of the moving system of the meter M, which is connected across the resistors R5 and R6 to respond to the output voltage, there will be no meter deflection. If desired, the alternating current that would flow through the meter under these conditions may be bypassed by a capacitor, not shown, which may be connected in parallel with the meter. If the bias applied to the grids of G1 and G2 is less or greater than the value shown in Fig. 4, the period of conduction in each tube is somewhat lengthened or shortened, but the action of the circuit is essentially the same.

In the system of Fig. 3, the meter M will register the component of bridge output voltage which is in phase with the voltage applied to the bridge. Furthermore, the meter will read upscale or down-scale, depending upon whether the bridge output voltage is in positive or negative phase relation to the bridge supply voltage. This is the condition in which the adjustable tap T is to the right or to the left of the true balance point.

A condition of extreme unbalance is graphically illustrated in Fig. 5. In Fig. 5, the anode voltage is designated 21a, the grid voltage G1 is designated 10a, and the grid voltage on G2 is designated 20a. The grid bias voltage on both of the grids from the battery B1 is designated 12a. During a half cycle, the bridge input and anode supply voltage vary sinusoidally from zero to a maximum and decrease to zero. The in-phase component of bridge output voltage applied to the grid of the tube V1 and designated 10a, increases from zero to a maximum and then decreases to zero. The in-phase component of bridge output voltage applied to the grid of the tube V2 decreases from zero to a negative maximum value and then increases to zero. During this entire half cycle, tube V1 conducts more than V2, its grid voltage being above the bias voltage 12a, whereas the grid voltage 20a applied to grid G2 is always below the bias voltage during this half cycle. It will be appreciated therefore that a positive voltage is applied to the upper terminal of the meter M and the unbalanced condition of the bridge therefore indicated in the meter deflection. The bridge may now be rebalanced to obtain a null indication by moving the tap of the potentiometer P in a direction to reduce the meter indication to zero. A suitable scale calibrated in the desired system of units may be disposed adjacent the tap of the potentiometer where a pointer operated by movement of the tap is utilized to indicate the desired condition. During the next half cycle of alternating current, the anodes of both tubes are negative, and no conduction takes place through either of them. Thus, a unidirectional voltage is applied to the meter M. If, however, the unbalance of the bridge had been such that the movable tap T was on the opposite side of the bridge balance point considered in the above paragraph, the potentials applied to the grids G1 and G2 would have been shifted 180 electrical degrees from the relation just considered, and conduction during the first half cycle would have been mostly through the tube V2, and a reading of the scale of the instrument in the reverse direction would have been obtained. With the potentiometer tap T at the true balance point, the tubes conduct equally and oppositely during one half cycle.

As noted hereinabove, the condition illustrated in Fig. 5 and hereinabove discussed is a condition of extreme unbalance. As the bridge goes from a balanced condition to an unbalanced condition, the point where the two grid voltages cross the grid bias (point B in Fig. 4) shifts in a continuous manner to the right or to the left depending on the direction of unbalance until the condition of Fig. 5 is reached as an extreme for a given direction of unbalance.

In Fig. 6 the instrument circuit is modified. In this figure, parts similar to those of Fig. 3 have been given like reference characters. Inasmuch as this change is concerned only with the instrument circuit, the remaining details of the circuit are not shown in the interest of simplicity. It will be appreciated, however, that the grids G1 and G2 will be energized as described in connection with Fig. 3. In Fig. 6, the resistors R5 and R6 are removed from the cathode circuit and placed in the anode circuit. The output current of the tubes therefore again flows through these resistors and results the same as those obtained in Fig. 3 are obtained in this modification.

Other modifications of the basic indicating circuit are possible within the scope of this invention. One such modification appears in Fig. 7 wherein pentodes V3 and V4 or other multiple element tubes are used in place of the tubes V1 and V2, and provided with suitable D. C. operating potentials for the tube elements. Tube V3 is provided with an anode A3, a suppressor grid SU3, a screen grid SC3, a control grid G3 and cathode C3. Tube V4 includes an anode A4, a suppressor grid SU4, a screen grid SC4, a control grid G4 and a cathode C4. The cathode circuits of these tubes are again connected with the resistors R5 and R6 in the circuit, and the indicating instrument M is connected across these resistors. The control grids G3 and G4 may again be energized, as illustrated in Fig. 3. However, in this embodiment, direct current voltage is applied to the anodes A3 and A4 indicated by the legend "D. C. anode voltage." The screen grids are connected together and have applied thereto a direct current voltage indicated by the legend "D. C. screen grid voltage." The A. C. supply voltage for the system is applied between the suppressor grid and cathode of each of tubes V3 and V4 by means of a transformer T3, the primary P3 of which is connected to the supply of alternating current. One side of the secondary winding S3 is connected between the resistors R5 and R6 and is grounded, while the other side of the secondary winding S3 is connected to both of the suppressor grids. This arrangement, it will be appreciated, affords a function analogous to that illustrated in Fig. 3. But in view of the additional control voltages applied to the multi-element tubes, a higher degree of accuracy in results may be achieved.

In Fig. 8, which again utilizes the tubes V3 and V4, the suppressor grids SU3 and SU4 of the respective tubes are connected to their respective cathode circuits. The screen grids are connected together and are controlled by the source of alternating current and by a D. C. screen grid voltage so designated in the drawing. This is accomplished by means of a transformer T3, the primary P3 of which is connected to the source of alternating current, and the secondary S3 which is connected on one side to both of the screen grids and on its other side is connected to the D. C. screen grid voltage supply. The control grids G3 and G4, respectively, for tubes V3 and V4 are again controlled as illustrated in Fig. 3. The anode circuits of these tubes are supplied by a D. C. anode voltage so designated in the drawing.

In each of Figs. 7 and 8, it will be appreciated that the resistors R5 and R6 may be included in the respective plate or anode circuits, as shown in Fig. 6. Additionally, resistors R5 and R6 could also be connected in the screen grid circuit and any grids not connected in parallel (like the anodes) could be used as control grids.

In a further embodiment of this invention, certain features hereof may be employed in the construction of an A. C. wattmeter usable in audio or radio frequency circuits. This may be accomplished by choosing vacuum tubes and associated circuit constants in such a way that the cathode current of each tube is a linear function of the A. C. potentials applied to the suppressor grids and control grids within the operating range. This is similar to the arrangement illustrated in Fig. 8. In this case, however, the potential applied to the control grids is derived from the current flowing in the circuit whose power is to be measured. This potential may be obtained by means of the voltage drop across a series resistor or from a current transformer T5, such as shown in Fig. 9. The voltage applied to the suppressor grids is proportional to the voltage of the alternating current system and may be derived from this voltage by means of a transformer T3. If the voltage of the circuit whose power is to be measured is of the right value, it may be applied directly to the suppressor grids SU3 and SU4 of the tubes. A voltage dividing network may also be employed to derive the suppressor grid voltages. This embodiment of the invention utilizes the square law property of tubes V3 and V4 to multiply the control conditions evidenced by the signals on the respective control grids and the respective suppressor grids of the tubes to produce an output voltage appearing across the resistors R5 and R6, which is indicative of the power flowing in the alternating current circuit designated by the lines L1 and L2.

This circuit may also be employed in any of its suggested modified forms as shown in Fig. 10 as a discriminator for measuring deviation from a preselected frequency. A tuned grid circuit is utilized in this application and the tuning of the grid circuit is set to correspond to the predetermined frequency from which a variation is to be indicated. The plate voltage of the tube is derived from the line voltage of the system by means of a transformer T1. The grid voltage is applied by means of a transformer T4, the primary winding P4 of which is connected across the voltage supply L1 and L2. The ends of the secondary winding S4 are connected to the respective grids G1 and G2 of the triodes V1 and V2. Capacitor C6, which is adjustable, is connected across the secondary winding S4, and is utilized to tune the grid circuit to the predetermined frequency value. In this embodiment the secondary winding S4 is preferably very loosely coupled to the primary winding P4. Thus, it will be appreciated that as long as the line frequency remains at the value for which the system is adjusted, there will be a null indication on the instrument M. However, upon deviation of this frequency either above or below that for which the grid circuits are tuned, a change in amount and phase of grid voltage will occur resulting in an indication of the instrument M, corresponding to the direction and degree of change in frequency.

This will be better appreciated from a study of the vector diagrams of Figs. 11 and 12. In Fig. 11 the line frequency corresponds to the frequency of the tuned circuit. Under this condition the line voltage $E_p$ and the induced voltage $E_s$, for the indicated circuit, are displaced by 90°. $I_s$ is the oscillatory current in the tuned circuit at resonance and $I_p$ is the current through the primary winding P4 and which lags the voltage $E_p$ by 90°. From the teachings relating to Fig. 3, it will be appreciated, in view of the quadrature relationship of the voltages $E_p$ and $E_s$ that the outputs of tubes V1 and V2 will apply alternating voltages in successive quarter cycles during alternate half cycles across the meter M which due to its electrical and mechanical inertia will remain unresponsive.

But upon a change in line frequency from that for which the tuned circuit is adjusted, the resulting impedance change changes the vectoral relationship of the voltages $E_p$ and $E_s$, the voltage $E_s$ shifting through an angle corresponding to the frequency swing. Hence, a component of voltage $E_s$ is introduced which is in phase with voltage $E_p$ and the instantaneous polarity of this component with respect to voltage $E_p$ depends upon whether or not the frequency has increased or decreased. The resulting instrument deflection denotes the amount and direction of the frequency swing.

The circuit of Fig. 10 is well suited in applications at radio and high audio frequencies. For low audio and power frequencies the circuit of Fig. 13 is better suited. The circuit of Fig. 13 deals only with the grid control circuit in the interest of simplicity, the connections of the terminals of the circuit being indicated in the drawings. In Fig. 13 the resonant circuit is replaced by a normally balanced electrical circuit or more specifically, a tuned bridge circuit including a center tapped impedance which may be an auto transformer T7, the tapped portions of which form adjacent legs of the bridge and the remaining adjacent legs of the bridge being formed by a resistor R7 and a capacitor C7. The output terminals of the bridge are formed by the center tap on the auto transformer and a terminal between the resistor and capacitor R7 and C7, respectively and the primary winding P8 of a transformer T8 is connected across the output terminals. The end terminals of secondary winding S8 for this output transformer are connected to the respective grids G1 and G2 and the center tap of the secondary winding connects with the battery B1 as, for example, in Fig. 10. The bridge is energized by connection of its input terminals across supply conductors L1 and L2. The general connection of the bridge circuit is much the same as the connections of the bridge of Fig. 3.

By proper selection of the circuit components of the bridge and/or providing a degree of variation in the electrical properties of the capacitor C7 and the resistor R7, the bridge may be adjusted to a condition of electrical balance for a given exciting frequency. Changes in the exciting frequency from that for which the bridge is tuned will therefore produce a change in impedance of the capacitor C7, which is frequency sensitive, with respect to resistor R7 and the resulting impedance unbalance produces a voltage across the output terminals of an instantaneous direction and magnitude depending upon the direction and magnitude of the frequency shift.

Since as in Fig. 10 the anode potentials are at the same frequency as the grid potentials, being connected to the same source, the inphase component of bridge unbalance voltage is measured in the system.

The vector diagram of Fig. 14 illustrates the voltage relationships in the bridge network, the solid vectors depicting the relative magnitudes and positions at bridge balance and the dotted vectors denoting a vector relationship for a given direction and magnitude of bridge unbalance. At bridge balance the voltage $E_s$ which is the bridge unbalance voltage is in quadrature with the bridge input voltage. Hence, there is no component of $E_s$ which is in phase of 180° out of phase with the voltage $E_p$ and the instrument stands at zero.

The dotted vectors depict a frequency change in a direction which increases the impedance and hence increases the voltage drop across capacitor C7. A shift in phase relation of voltage $E_s$ with respect to $E_p$ therefore occurs introducing a component of $E_s$ which is in phase with $E_p$ which as above described is measured by the circuit. Similar results are achievable by utilizing an inductor in place of the capacitor C7.

Yet a further variation in the circuit for detecting frequency variations appears in Fig. 15, illustrating another form of a normally balanced electrical circuit, specifically, a bridge-T three terminal network, including the capacitors C8 and resistors R8 connected as shown, which may replace the bridge circuit of Fig. 13. This circuit is also frequency sensitive and for a particular frequency depending on the value of the resistors and capacitors incorporated therein the output can be made zero. Above the given frequency, the output becomes increasingly great as the frequency increases, and it has a component in phase with the input. Below the given frequency, the output increases as the frequency decreases, and it has a component 180° out of phase with the input. Both conditions of output are with respect to the voltage of the source represented in conductors L1 and L2. As in the case of Fig. 13, the output of transformer T4a of Fig. 15 controls the grids of tubes as shown in Fig. 10 and to this end one side of secondary winding S4a is connected to grid G1 while the other side is connected to grid G2, the center tap being connected to the battery B1.

A bridged-T network of this type may be substituted for the four terminal bridge of Fig. 3 and the capacitors replaced by inductors two of which could be the gauge coils X1 and X2 of Fig. 1. Assuming a constant frequency source, the network balance or unbalance would then be controlled by the gauge coil impedances.

The embodiment of this invention illustrated in Fig. 16 covers the application of this invention in the measurement of a component of a voltage which is in phase with the voltage from a reference source of the same frequency. The basic circuit includes the parallel connected tubes V1 and V2 which are energized by the reference source of voltage E4. The grids G1 and G2 are connected to the opposite sides of the secondary of transformer T4 which is center tapped and connected to grid bias battery B1 as before. The primary of transformer T4 is connected to the source E3, the component of voltage of which, in phase with that of reference source E4, is to be measured.

By the discussion of the basic circuit made in connection with Fig. 3, it will be appreciated that when the source E3 is exactly in quadrature phase with the reference source E4 a null indication obtains. But when a swing from this quadrature relation obtains an inphase component is produced unbalancing the output of the tubes in dependence of the magnitude of the inphase component. Since the magnitude of the inphase component is a function of the angular shift from quadrature relation of the two voltages, the scale of instrument M may be calibrated in degrees to indicate the actual phase angle.

A circuit of this general type has numerous applications, an important one being the determination of the angular plane of the unbalance in a rotating member, a factor which must be known in balancing rotatable devices. In such an application the source of reference voltage would be produced by a generator driven at the speed of the rotatable member being balanced. In practice, assuming the rotatable member is a motor rotor set up in a balancing machine, the generator is coupled to the machine to be driven at shaft speed. Source E3 could be the voltage produced by an electromagnetic pickup having a moving element actuated by transverse displacements of the rotor shaft in a single plane. Due to the mechanical coupling of the two generating units through the rotor shaft, the generated voltages will be of the same frequency and their phase will depend upon the angular position of the unbalance for a particular indexing of the reference source generator. Consequently, the magnitude of the inphase component will denote the actual phase of relationship assuming that the pickup voltage is independent of amplitude of shaft vibration. The reference source generator is usually provided with a rotatable stator in which case in this application the stator may be rotated to produce a null indication on the instrument and/or a maximum instrument reading and the degrees of stator rotation utilized to obtain an actual indication of the angular plane of the unbalance. At this point in the balancing procedure, the amount of the unbalance may be determined in this same circuit by utilizing a pickup for producing voltage E3 which is responsive to vibration amplitude. Suitable switching means may be utilized to provide convenient switching between the two pickups.

Fig. 17 is a further application of this basic circuit in determining with great accuracy when two voltages of the same frequency but not necessarily in phase or 180° out of phase are equal in magnitude. In accomplishing this, the basic tube circuit is again utilized, the tubes being energized by the vectoral sum of the two voltages and controlled as a function of their vectoral difference. In Fig. 17 the two source voltages to be compared are designated E1 and E2. These are connected in additive series relation in adjacent legs of a conventional bridge circuit, the remaining two adjacent legs of which are constituted in the tapped portions of the centertapped primary P11 of a transformer T11. The secondary, S11, of this transformer is connected to energize the parallel connected tubes. Bridge output voltage is applied across the primary P12 of a transformer T12, which primary is connected across the output terminals of the bridge represented in the centertap of primary P11 and the point between the two source voltages. Secondary winding S12 has its winding ends connected to the respective grids G1 and G2 and its centertap to bias battery B1 as before.

As will be noted from Figs. 18 and 19 when E1 and E2 are equal in magnitude but out of phase, their vectoral difference represented in voltage $E_g$, the bridge unbalance voltage, is in quadrature with the voltage $E_p$. Therefore no indication on meter M occurs. But as shown in Fig. 19, when the voltages are unequal, the voltage $E_g$ again representing the vector difference is no longer in quadrature with voltage $E_p$ and therefore has a component which is in phase with $E_p$. The instantaneous polarity of this component with respect to $E_p$ controls the tubes V1 and V2 in such a way that the direction of deflection of instrument M indicates which voltage is the greater so that adjustments may be made to equalize these voltages.

While several embodiments of this invention and various modifications in its details have been hereinabove considered and illustrated in the drawings, it will be appreciated that numerous other embodiments and variations may be obtained by those skilled in the art without departing from the spirit and scope of this invention. Accordingly, it is intended that this disclosure shall be considered only as illustrative of the principles of this invention and not interpreted in a limiting sense.

We claim as our invention:

1. In apparatus responsive to a difference in magnitude between two alternating current voltages of the same frequency, the combination of, a pair of similar electric discharge devices each having an anode, a cathode and at least one control grid, an electrical bridge circuit, a transformer having a tapped primary winding and a secondary winding, the tapped portions of said primary winding forming adjacent legs of said bridge circuit, one of the remaining adjacent legs of said bridge circuit being adapted to have applied therein one of alternating current voltage and the remaining adjacent leg of said bridge circuit being adapted to have applied therein the other alternating current voltage in a sense vectorally adding to the first alternating current voltage, circuit means connecting the anodes and the cathodes of said electric discharge devices in parallel with said secondary winding, a second transformer having a primary winding and a secondary winding, said primary winding of said second transformer being connected between a tap on the primary winding of the first transformer and a point between the adjacent legs of said bridge circuit to which said alternating current voltages are applicable, said secondary winding being connected between the control grids of said discharge devices, electrical means connected to a tap of the secondary winding of the second transformer for applying a unidirectional voltage thereto for biasing the control grids, and circuit means responsive to the electrical output of said discharge devices.

2. In a circuit responsive to a difference in magnitude of two alternating current voltages of the same frequency, the combination of, a pair of similar electrical amplifiers, an electrical bridge circuit, a transformer having a tapped primary winding and a secondary winding, said amplifiers being connected in parallel across said secondary winding, the tapped portions of said primary winding constituting adjacent legs of said bridge circuit, the remaining adjacent legs of said bridge circuit being adapted to have applied therein said respective alternating current voltages in vectorally aiding relation, circuit means responsive to the output of said bridge circuit for controlling said amplifiers in 180° phase relation, and circuit means responsive to the difference in outputs of said amplifiers.

3. In apparatus responsive to a difference in magnitude between two alternating current voltages of the same frequency, the combination of, a pair of similar electric discharge devices each having a control electrode, a circuit adapted to be connected to said alternating current voltages including means for obtaining the sum and the difference of said voltages and having a first output circuit energized by said sum of said voltages and having a second output circuit energized by said difference of said voltages, circuit means connecting said discharge devices in parallel across said first output circuit, circuit means connecting said respective control electrodes to opposite sides of said second output circuit for controlling said electric discharge devices in 180° phase relation, and circuit means responsive to the electrical output of said discharge devices.

4. In a circuit responsive to a difference in magnitude of two alternating current voltages of the same frequency, the combination of, a pair of similar electrical amplifiers, a bridge circuit adapted to have said respective alternating current voltages applied in adjacent legs thereof in aiding relation, said bridge circuit having one output circuit in which the voltage corresponds to the sum of said two alternating current voltages and having a second output circuit in which the voltage corresponds to the difference of said two alternating current voltages, a circuit including impedance means connecting said amplifiers in parallel across said one output circuit, circuit connections connecting said amplifiers to said second output circuit to control said amplifiers in 180° phase relation, and circuit means electrically connected to said impedance means to be energized thereby.

MILTON P. VORE.
MAURICE J. GELPI.

References Cited in the file of this patent

UNITED STATES PATENTS

| Number | Name | Date |
|---|---|---|
| 2,434,822 | Van Beuren et al. | Jan. 20, 1948 |